May 26, 1970     H. E. MARTIN     3,514,688
OUTPUT-TRANSFORMERLESS STATIC INVERTER
Filed March 28, 1968     3 Sheets-Sheet 2
FIG. 2
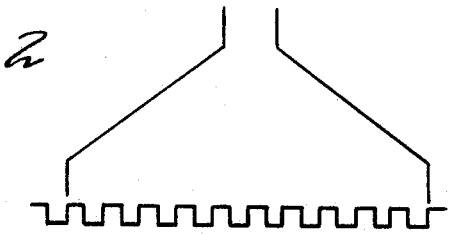
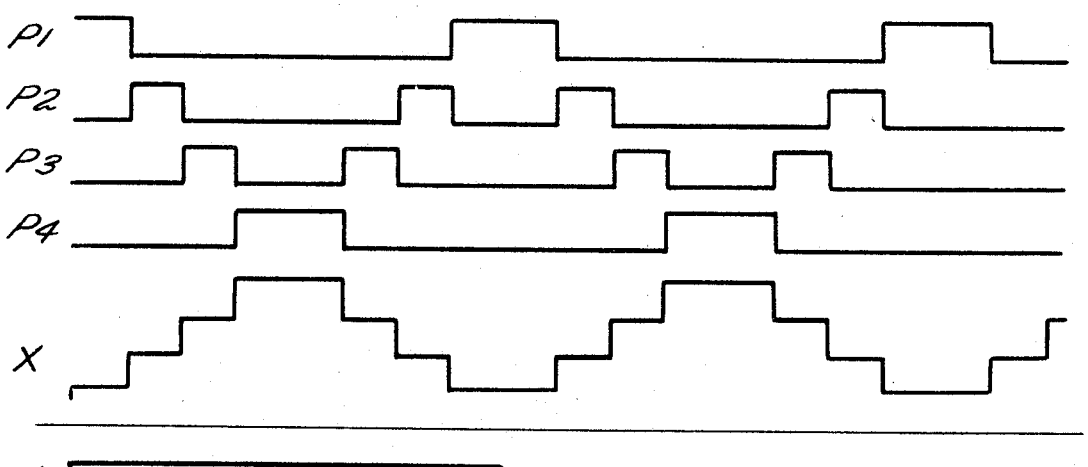
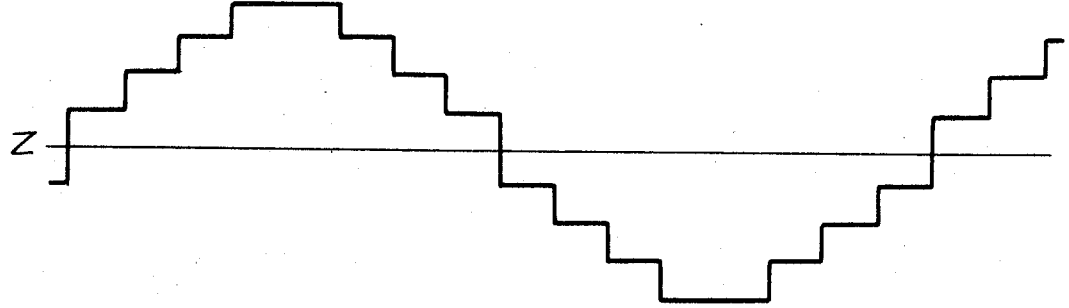
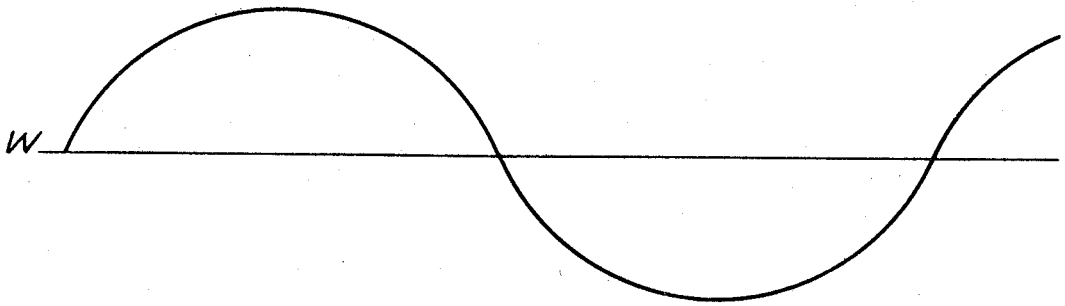

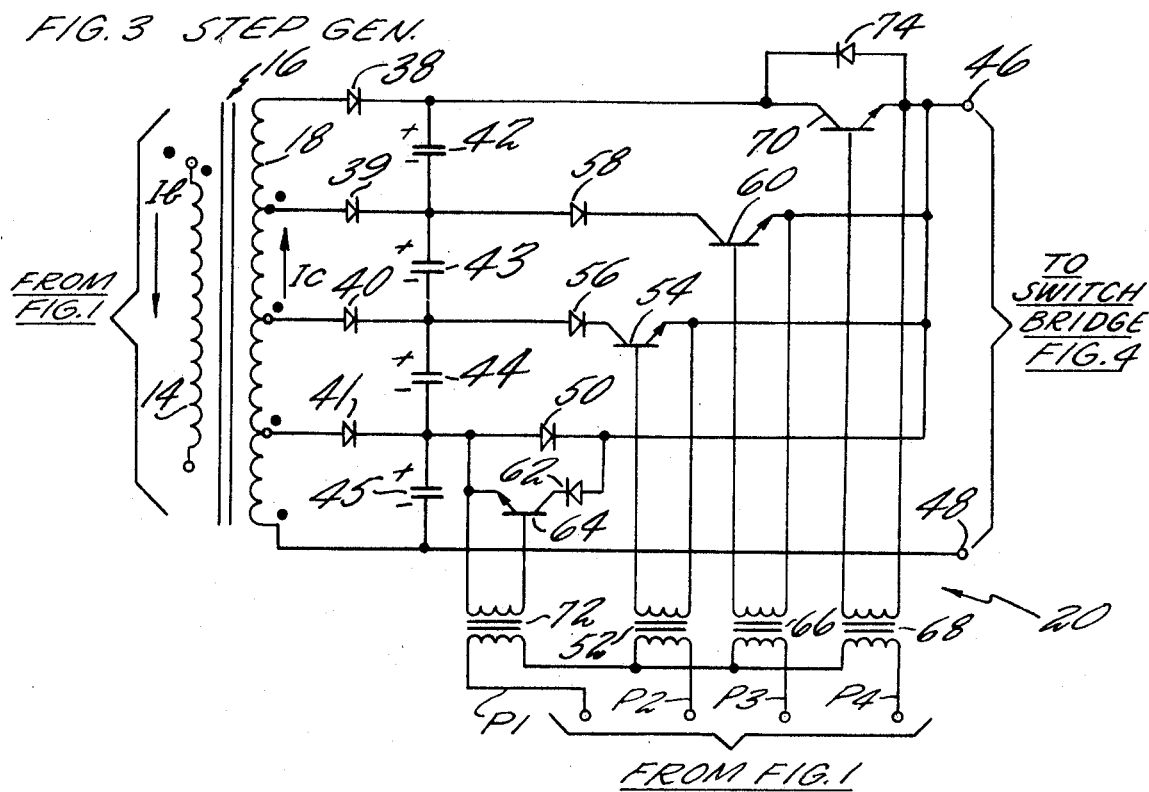
FIG. 3 STEP GEN.
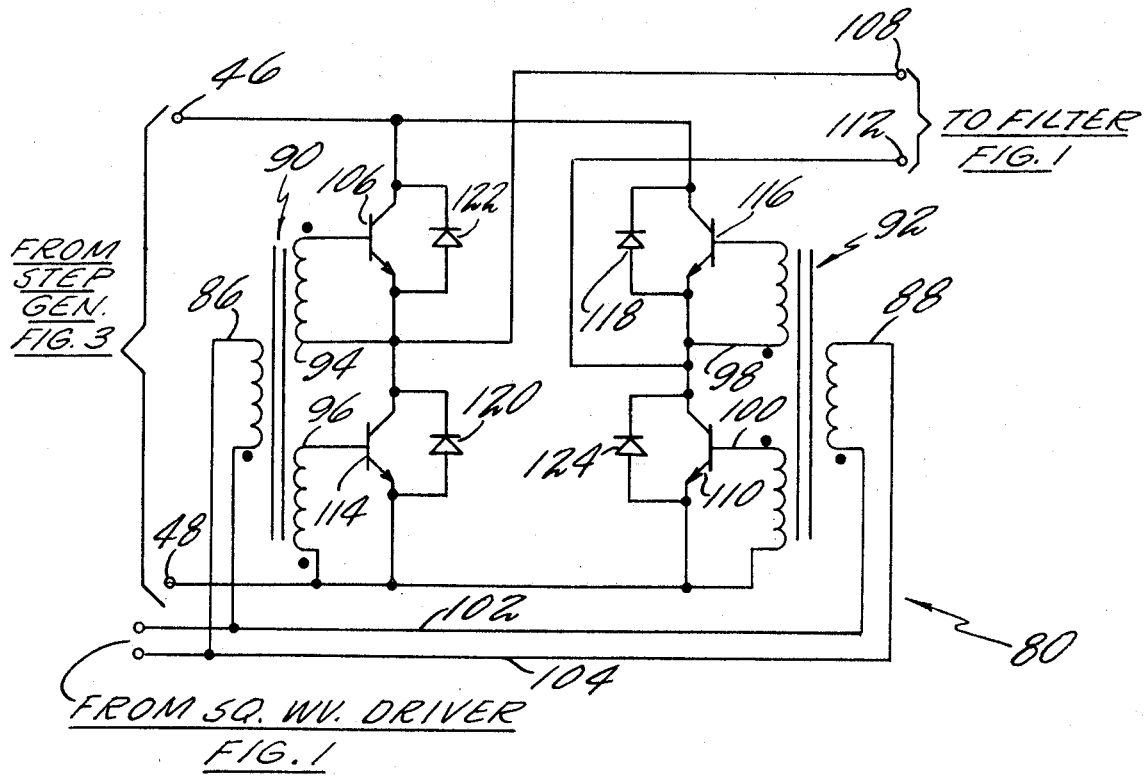
FIG. 4 SWITCH BRIDGE

United States Patent Office 3,514,688
Patented May 26, 1970

3,514,688
OUTPUT-TRANSFORMERLESS STATIC INVERTER
Henry E. Martin, Wapping, Conn., assignor to United Aircraft Corporation, East Hartford, Conn., a corporation of Delaware
Filed Mar. 28, 1968, Ser. No. 716,744
Int. Cl. H02m 3/32, 1/12; G05f 1/14
U.S. Cl. 321—2      4 Claims

ABSTRACT OF THE DISCLOSURE

A high frequency flyback converter including a transformer having a tapped secondary for charging a plurality of condensers supplies plural DC voltage levels which are selectively switched so as to provide a sequence of staircase power wave forms. A polarity reversing switching bridge provides alternating polarity, which with filtering generates the neo-sinusoidal AC output. Sensing of excessive current blocks the switching of the higher voltages in the staircase during short circuit operation. Conventional pulse width modulation is used for voltage regulation. Reverse currents due to power factor lag are accommodated.

BACKGROUND OF THE INVENTION

Field of art

This invention relates to static inverters, and more particularly to an improved static inverter which requires no output transformer, has low odd harmonic content, is capable of short circuit and low power factor operation, and has a low start up DC current surge.

Description of the prior art

The generation of alternating current power from low voltage direct current sources (such as batteries) has long been known in the art. Such systems are most frequently referred to as static inverter systems whenever rotary machinery is not used for the power conversion. Both single phase and multi-phase alternating current power has been generated from static DC sources. Most of the systems known to the prior art require the use of an output transformer in order to permit proper referencing of the alternating current output to ground without interference between the alternating and DC portions of the circuit. Additionally, transformer output has been required in order to handle out of phase currents resulting from reactive loads. Thus, when the voltage is positive the current may still be negative, in dependence upon the power factor of the load being fed. Another problem with static inverters known to the prior art is that direct current surges are usually associated during the start up of such devices because of direct connection of the load to the source through the flywheel converter.

SUMMARY OF THE INVENTION

The object of the present invention is to provide an improved static inverter:

which requires no output transformer;
which is virtually not susceptible to DC current surges upon startup;
which is capable of delivering out of phase current;
which has a low odd harmonic content; and
which is capable of delivering power under short circuit conditions indefinitely.

According to the present invention, a stepped wave form is generated to approximate sinusoidal power. This wave form is alternatively switched to provide the two half waves, and output filtering smooths the bipolar wave into alternating current output power. In accordance further with the present invention, a plurality of switches are used to select from among corresponding potentials so as to develop the stepped wave form, and the selected potentials form a stepped approximation of half of a sinusoid. In further accord with the present invention, the half cycle stepped waves are alternately reversed in polarity, and filtering provides substantially sinusoidal output power. In accordance still further with the present invention, selecting of the potentials is restricted to the lowest potential in the case of an over current, thereby reduced potential, alternating polarity, essentially square wave output is delivered during short circuit conditions, and this delivery can be maintained substantially indefinitely. In still further accord with the present invention, the step generator is DC isolated from the source by inductive coupling so that the usual DC surge currents are limited at startup.

The invention herein is capable of incorporating many of the advantages known to the prior art, such as pulse width modulated switching so as to control output potentials by controlling the switching of the DC converter input to the step generator as well as controlling the switching of the step generator itself.

The foregoing and other objects, features and advantages of the present invention will become more apparent in the light of the following detailed description of a preferred embodiment thereof, as illustrated in the accompanying drawings.

BRIEF DESCRIPTION OF THE DRAWINGS

FIG. 2 is a diagram illustrating various wave forms atendant the operation of the embodiment of FIG. 1;
FIG. 3 is a schematic diagram of a step generator for incorporation in the embodiment of FIG. 1;
and
FIG. 4 is a schematic diagram of a switch bridge suitable for incorporation in the embodiment of FIG. 1.

DESCRIPTION OF THE PREFERRED EMBODIMENT

Figure 1:
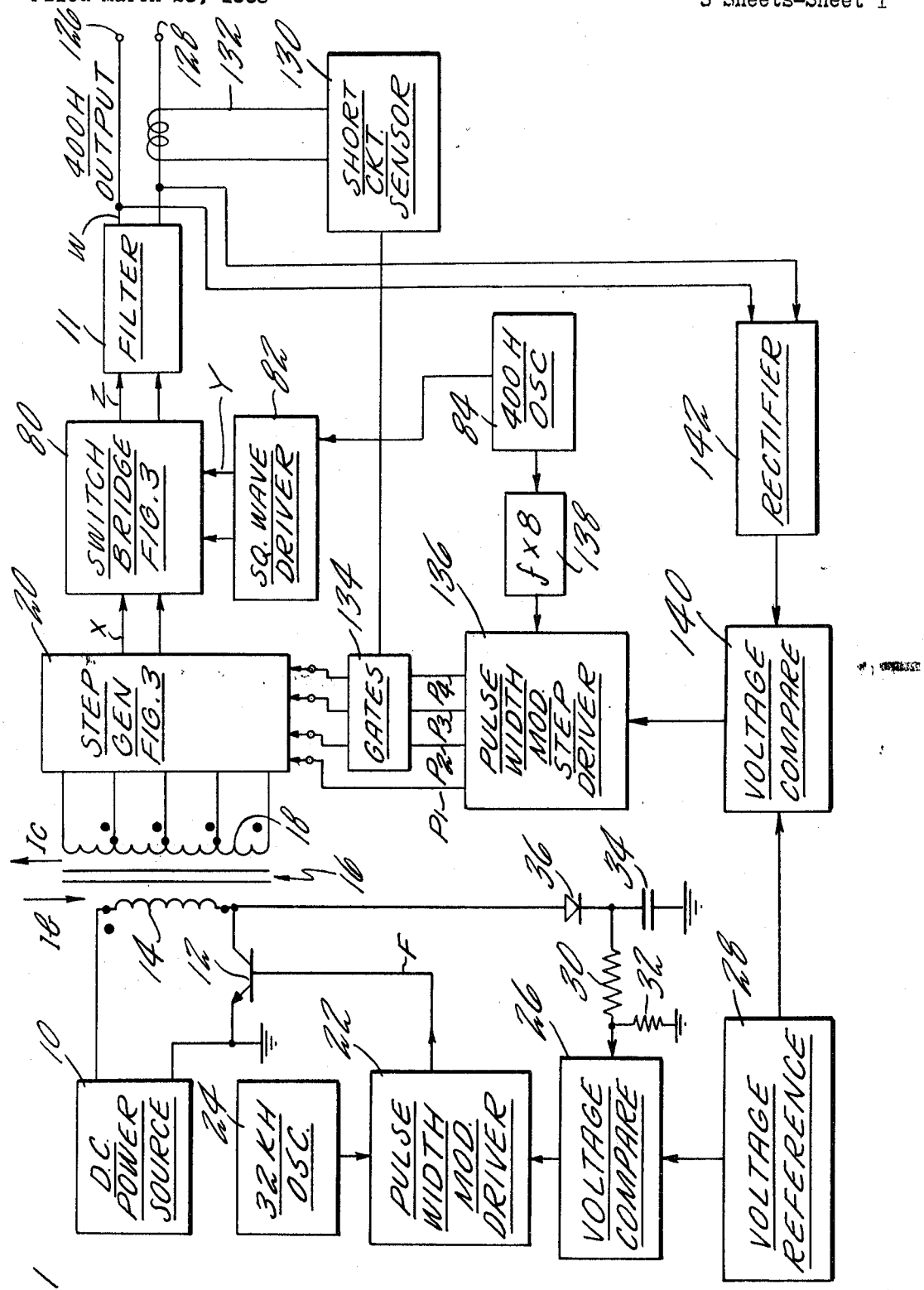
FIG. 1 is a schematic block diagram of a preferred embodiment of the present invention.

A system incorporating the present invention is illustrated in FIG. 1 wherein direct current power from a DC power source 10 is converted to 400-hertz output power from a filter 11. The DC power source 10 may be a battery or other suitable source of DC power, and may be of any suitable voltage since the present invention will accommodate a great variety of power sources for a large number of different suitable output powers, as is described hereinafter. The basic operation of this system is best described with respect to FIG. 2. The objective of the embodiment of FIG. 1 is to provide the stepped wave form X, gated with the square wave driver signal Y, so as to provide an alternating stepped wave form Z which, with filtering, will result in the sinusoidal output as shown in wave form W. To achieve this, the DC power source 10 is selectively gated by a power transistor 12 so as to cause current to flow in the primary 14 of a transformer 16, the secondary 18 of which is provided with a plurality of taps so as to provide levels of DC voltage for selection by a step generator 20, the details of which are illustrated in FIG. 3 and described hereinafter. The transistor 12 and transformer 16 form a flyback converter which is controlled by a pulse width modulated driver 22, the frequency of which may be governed by a suitable oscillator 24. For purposes of illustration herein, a 32-kilohertz oscillator is shown. Each time that the output of the pulse width modulator driver 22 is positive, the transistor 12 will conduct causing current from the DC power source 10 to flow through the primary 14 of the transformer 16.

Because of the high frequency of the pulse width modulator driver 22 in contrast with the time constant of the primary 14 (see wave form F, FIG. 2, which is shown on a reduced time scale), the maximum current which could flow through the primary 14 and the transistor 12 in response to the potential of the DC power source 10 is never reached. Therefore, the maximum current reached in any cycle of the pulse width modulator driver 22 is a function of the pulse width of the positive phase of the signal applied to the base of the transistor 12. This being so, by varying the width of the signal applied to the transistor 12, the maximum current reached in the primary 14 during any cycle is controllable. In order to take advantage of this, a voltage comparator 26 is responsive to a voltage reference 28, which may comprise, for example, a Zener diode connected through a series resistance to the DC power source 10 or other suitable DC potential. The other input to the voltage comparator 26 is the output of a voltage divider comprising a pair of resistors 30, 32 which are, in turn, connected across a capacitor 34, the voltage which is connected to the joinder of the primary 14 and the collector of transistor 12 by a diode 36. The average voltage across the capacitor 34 is a function of the maximum current reached in the primary 14 during the portion of the cycle when the transistor 12 is conducting and the load placed on the step generator 20 by the switch bridge. When transistor 12 is in the nonconducting of the switching cycle, the primary 14 is acting as a generator due to the collapse of the magnetic field in the primary 14. This causes current to flow from the source 10 to the primary 14 the diode 36 and the resistors 30, 32. Thus, the input to the voltage comparator 26 from the resistors 30, 32 is a function of the current flow in the primary 14, and by comparison with the voltage reference 28, this can be utilized to control the pulse width of the gating signal supplied to the transistor 12 thereby to control the amount of energy applied to the primary 14 of the transformer 16. This tends to regulate the starting conditions for the generation of the sinusoidal AC output.

Referring now to FIGS. 1, 2 and 3, the step generator 20 includes a plurality of diodes 38–41 and corresponding capacitors 42–45 each bridging a portion of the tapped secondary 18 of the transformer 16. In operation, each time that the transistor 12 conducts, causing current flow in the primary 14 in a direction indicated by the arrow Ib (downward in FIGS. 1 and 3), a magnetic field established in the transformer 16. When the transistor 12 ceases conduction, the field in the transformer collapses and causes current flow in the direction Ic (upwardly in the secondary as shown in FIGS. 1 and 3) thus charging all of the capacitors 42–45 with the polarities indicated in FIG. 3 (positive at the top). If the transformer secondary 18 and the capacitors 42–45 were perfectly balanced under all load conditions during each cycle, there would be no need for the taps in the secondary 18 nor for the diodes 39–41. However, these diodes insure a balanced division of potential between the capacitors 42–45. It should be noted that the charging of the capacitors 42–45 is repeated on a cyclic basis at the frequency at which the transistor 12 is switched (32 kHz. in the present example). Thus, in a 400-hertz generator (as in the present example) the capacitors are charged 80 times per cycle of output. There is thus no need for synchronization between the switching of transistor 12 and the operation of the step generator 20 (as is described below).

Referring to FIG. 2, during the time that signal P1 is on, the output of the step generator 20, which is between a pair of terminals 46, 48 (to the right in FIG. 3) comprises the voltage across capacitor 45, which is coupled to the terminal 46 through a diode 50. This coupling is automatic as a result of diode 50 being forwardly biased, and does not utilize switching signal P1 in order to connect capacitor 45 to terminal 46. During the time when P2 is on (FIG. 2) there is a positive signal fed through a transformer 52 (FIG. 3) to the base of a transistor 54 which causes transistor 54 to conduct, thereby connecting the positive side of capacitor 44 to the terminal 46. This causes the diode 50 to be reverse biased so that it no longer conducts, and there is no longer a direct connection from the positive side of capacitor 45 to the terminal 46. Instead, the series pair of capacitors 44 and 45 are now connected through the transistor 54, between the terminals 46, 48. A diode 56 is connected in series with the collector of transistor 54, oriented to be forwardly biased as a result of the potential between the capacitors 44, 45 when the transistor 54 is conducting. The purpose of the diode 56 is to prevent an excessive leakage current through the transistor 54 when it is turned off (as it about to be described) as a result of reverse bias. Similarly, a diode 58 prevents over reverse biasing of a transistor 60, and a diode 62 prevents over reverse biasing of a transistor 64. During the time when signal P3 is present, there is a positive signal applied through a transformer 66 to the base of transistor 60 causing this transistor to conduct through the protection diode 58. At the same time, the signal P2 disappears so that there is no longer a positive signal on the base of transistor 54. Notice that when transistor 60 begins conducting and transistor 54 ceases conduction, the diode 50 is still reverse biased so that the potential between the terminals 46, 48 is now the total of the potentials across three capacitors 43–45. When signal P4 (FIG. 2) appears, a positive signal is coupled through a transformer 68 to the base of a transistor 70 so that it conducts, and the signal at the base of transistor 60 disappears so that it stops conducting. This causes the full voltage of four capacitors 42–45 to be connected across the terminals 46–48. Note that the transistor 70 needs no reverse bias protection diode since it is not reverse biased, there being no positive potential applied to the emitter thereof relative to the collector since there are no higher potentials than that coupled by the transistor 70.

The diodes 38–41 each provide direct coupling of power from a corresponding portion of the transformer secondary 18 directly to the output terminal 46 whenever the corresponding diode 50, or transistor 54, 60, 70 is conducting. For instance, during the time that signal P2 is present, power from the first two sections of the secondary is coupled directly through the diode 40, diode 56, and transistor 54 to the output terminal 46. This overcomes the different loading that would take place and the difference in potential between capacitors 42–45 which would occur as a result of the loading effect of the output during the various times (P1–P4) that the different ones of the capacitors 42–45 are loaded by the output circuit.

During time P1, a transformer 72 causes a positive potential to be applied to the base of the transistor 64 so that this transistor can conduct. It should be noted that the purpose of this transistor is not for the basic conduction (which is accomplished through diode 50). Instead, this transistor is effective to conduct current which is out of phase with the voltage as a result of inductive load current lag. When the output AC voltage crosses zero reference from negative to positive, for instance, the current may still be negative due to inductance of the load which causes a current lag. As is described hereinafter, this current lag is permitted to be coupled back to the step generator through the switch bridge, and this lag occurs during the time that diode 50 is providing conduction to the terminal point 46 as described hereinbefore. This corresponds with the times that signal P1 is on (FIG. 2) since this is a period within the cycle at which the output voltage crosses a zero reference from negative to positive, or vice versa, as illustrated by wave form W in contrast with the wave form X (FIG. 2).

The transistor 70, which couples the highest voltage to the output terminal 46, is bridged by a diode 74 to shunt transients around the transistor 70 which occur as a result of two different phenomena. First, when transistor 70 is turned off (at the end of time P4), the voltage drops immediately, so any inductance in the load may cause an inductive kick. Second, when the polarity of the switching bridge reverses (as described more fully hereinafter with respect to FIG. 4) it is possible to generate voltage spikes, particularly when a highly inductive load is attached to the AC output hereof. The diode 74 limits the magnitude of these spikes to the maximum voltage appearing across the total of the capacitors 42–45 by clamping the output point 46 to the positive side of capacitor 42.

The exact potential across each of the capacitors 42–45 is suitably adjusted by the positioning of related taps on a transformer 18 so that the magnitude of the steps generated (wave form X, FIG. 2), with polarity reversal (wave form Z), is such that when suitably filtered it will very nearly approximate a sine wave. Thus, the tap may preferably be adjusted so that the potential across capacitor 42 is greater or less than that across capacitor 43, and it in turn may have a higher or lower potential than that across the capacitors 44 or 45.

The output of the step generator 20 (FIG. 3) is applied to a switch bridge 80 which is shown in detail in FIG. 4. The switch bridge is controlled by a square wave input derived from a square wave driver 82, which in turn is governed by a 400-hertz oscillator 82. The frequency of the oscillator 84 is determinative of the output power frequency. Thus, a 60-hertz oscillator might be utilized to generate conventional house current with apparatus incorporating the present invention. In FIG. 4, the controlling square wave signal (wave form Y, FIG. 2) is applied to the primary windings 86, 88 of a pair of transformers 90, 92. Each of the transformers 90, 92 has a pair of secondary windings 94, 96; 98, 100. As shown by the dot notation in FIG. 4, the secondaries of each transformer are oppositely phased in relationship to the bases of transistors controlled thereby. Consider first the time when wave form Y (FIG. 2) is relatively positive. For illustrative purposes, a line 102 from the square wave driver will be positive and a line 104 from the square wave driver will be relatively negative with respect thereto. This makes the dotted side of the transformer primaries 86, 88 positive so that the dotted side of the secondaries are positive. Thus, the secondary 94 will supply a positive signal to the base of a transistor 106 so that current will conduct from the terminal 46 through transistor 106 and to a terminal 108. The transformer secondary 100 similarly applies a positive signal to the base of a transistor 110 so that it conducts from the terminal 48 to a terminal 112. At this time, transformer secondary 96 applies a negative voltage to the base of a transistor 114, and similarly, the secondary 98 applies a negative voltage to the base of a transistor 116, so that these transistors do not conduct. Consider next when wave form Y is relatively negative and thus the lines from the square wave driver to the switch bridge are oriented with line 104 positive and line 102 negative. This makes the undotted ends of the primaries positive so that the undotted ends of the secondaries will be positive also. Thus, the transformer secondary 96 now applies a positive potential to transistor 114 so that it conducts from the terminal 48 to the terminal 108, and the transistor secondary 98 applies a positive potential to the base of the transistor 116 so it conducts from the terminal 46 to the terminal 112. At this time, negative potentials are applied by secondaries 94 and 100 to the bases of transistors 106 and 110 so that they are not conducting. Thus, the switch bridge alternately reverses the polarity of terminals 108, 112 with respect to the terminals 46, 48.

Due to lagging currents which result from inductive loads (as described briefly hereinbefore) it is possible for the current to be negative with respect to voltage at a point in time when the voltage is crossing zero reference (wave form W, FIG. 2). Consider first a time when the switch bridge 80 has just reversed from causing a positive half cycle to causing the negative half cycle. Transistors 114 and 116 will be conducting so as to provide positive potential at terminal 112 and negative potential at terminal 108. However, terminal 108 has previously been positive and current should be flowing outwardly through terminal 108 just before switching. If the current lags the voltage, the current will still tend to flow out through terminal 108 and in through terminal 112. However, the current cannot flow from the emitter to the collector of transistor 116 from terminal 112 to terminal 46; similarly the current cannot flow from the terminal 48 and from its emitter to the collector of transistor 14 to the terminal 108. For this reason, respective diodes 118, 120 are provided to permit current to flow around the transistors when the current is of opposite polarity to the voltage. Similarly, a pair of diodes 122, 124 bridge respective transistors 106, 110 for the same purpose. It is also to be noted that these diodes are always reverse biased whenever the corresponding transistor is cut off. In the example under consideration, transistor 106 is cut off, but terminal 108 is connected to terminal 48 and therefor the anode of diode 122 is connected to a negative potential whereas the cathode is connected to the positive potential at terminal 46. Similarly, the cathode of diode 118 is always connected to the positive terminal 46; whenever transistor 116 is not conducting, transistor 110 connects the anode of diode 118 to terminal 48. Similarly, the anode of diode 120 is connected to the negative terminal 48 and its cathode will be connected through transistor 106 to the positive terminal 46 whenever transistor 114 is not conducting and transistor 106 is therefor conducting. The same is true for diode 124. Considering transistor 116 conducting, then the reverse bias is removed from diode 118 so that it will conduct any negative currents. Thus, the switch bridge shown herein not only accommodates the reversal of polarity of alternate half cycles so as to provide a bipolar output, but permits lagging currents to flow oppositely to the direction of voltage caused by the switching bridge. This is one of the features of the present invention.

The output of the switch bridge 80 shown in detail in FIG. 4 is applied to the filter 11 (FIG. 1). Since no output transformer is utilized, and a balanced output relative to ground is provided as described hereinbefore, the filter may be of any suitable form including a simple L-type filter with a series inductor and a shunt capacitor between the output lines. Any other suitable form of filter may be utilized to suit the perimeters of a particular implementation of the present invention and the load being driven thereby. The output of the filter 11 comprises the output of the static inverter on a pair of terminals 126, 128.

Another feature of the present invention is that the static inverter in accordance herewith may include apparatus to permit operating in a modified mode under short circuit conditions (that is, with excessive current). To this end, a short circuit sensor 130 may be responsive to a current monitoring device such as an inductively coupled current transducer 132, and the current sensor 130 may provide a signal in response to currents in excess of a predetermined magnitude. For example, the short circuit sensor 130 may provide a signal to block a plurality of gates 134 in response to excessive current. The gates 134 may be simple AND circuits, and the signal supplied by the short circuit sensor 130 may comprise a negative (or blocking) signal to the gates. Gates are provided (as shown in FIG. 1 to block signals P2, P3 and P4 (FIGS. 2 and 3) from reaching related transformers 52, 66, 68. This in turn prevents the turn-on of transistors 54, 60 and 70 so that only the first step of the step wave is generated whenever the short circuit sensor provides a signal to the gates 134. This results in essentially a square wave output (quite similar to wave form Y in FIG. 2) whenever excessive currents are sensed. The purpose of this feature of the invention is to permit maintenance of power from the device, but at a reduced potential, so that damage is minimal. On the other hand, maintaining power output of the device under short circuit conditions is advantageous because it can be used to activate circuit breakers in series with the load connected to output terminals 126, 128 and thereby eliminate the short circuit conditions. Notice that the P1 signal is not blocked from reaching transformer 72; thus, the lagging current bypass of diode 50 (described hereinbefore) is possible even under short circuit conditions. Further, the operation of the step generator 20 of FIG. 3, as described hereinbefore, illustrates the advantage of utilizing a diode 50 as a switch for the first step; the diode 50 being turned off by back biasing whenever the transistors 54, 60 or 70 are operated, and the diode 50 otherwise maintaining conduction from capacitor 45 to terminal 46 at all times. Thus, this diode provides automatic switching for both normal operation and for a constant, first step, low voltage output during short circuit operation when transistors 54, 60 and 70 are blocked from operating.

The step generator control signals P1–P4 are generated by a pulse width modulator step driver 136, the timing of which is controlled by a frequency multiplier 138 which in turn is response to the 400-hertz oscillator 84. The frequency multiplier 138 is utilized so as to provide the eight distinct times illustrated in FIG. 2 which relate to the different steps produced by the step generator 20, as described hereinbefore. The pulse width modulator step driver 136 may have its modulation (that is the width of the distinct signals P1–P4) controlled by the output of a voltage comparator 140 which is responsive to the voltage reference 28 and to the output of a rectifier 142 which provides a DC indication of the magnitude of the AC output voltage across the terminals 126, 128. The rectifier 142 may be of any suitable conventional type.

One of the features of the invention is the fact that start up DC surge currents are minimized in accordince herewith. This results from the fact that unlike conventional static converters which use a simple inductive flyback generator, the present invention incorporates inductive coupling in the flyback by means of the transformer 16. Thus, the only energy which can be transferred to the output circuit upon start up is energy transferred through the transformer 16. This contrasts with conventional flybacks wherein a single inductor is loaded and there is a direct connection from the inductor into a capacitor which charges, and this direct connection can cause direct loading of the DC source during startup. Thus, the present invention limits the current under the maximum load conditions of initially connecting the static inverter output to a load.

Although not a part of the present invention, the pulse width modulators 22, 136 provide good voltage control in the present invention. The width of any step can be adjusted by the driver 136 so as to adjust the voltage in accordance with load conditions, and the driver 22 can adjust the duty cycle of transistor 12 so as to control the amount of energy transferred to the transformer 16. Such pulse width modulated drivers in static inverters are well known, and the operation thereof will not be included herein. However, it is to be noted that the present invention is compatible with such voltage controllers, and that the advantages herein do not mitigate the sophistication available in static inverters of the prior art.

The present invention is illustrated in terms of a single phase output. However, it should be understood that multiple phase outputs may be implemented in accordance with the teaching of the present invention. For instance, if the transformer 16 where provided with three secondary windings, each relating to its own step generator, switch bridge and filter, and the control of the switch bridges for the three phases were properly synchronized, then three phase output could readily be achieved. Of course, additional provisions would need to be made for proper connection of output signals from the pulse width modulator step driver 136: a simple form would provide eight distinct timing periods, each timing period being suitably coupled through logic circuitry so as to cause the generation of steps in the separate step generators in an appropriate fashion, all in accordance with the skill of the art.

Similarly, the representative frequencies described herein (that is, a 32-khz. flyback generator and a 400-hertz output signal) are illustrative merely, and various combinations may be employed in any given embodiment. It is further to be noted that although a novel step generator having certain advantages is disclosed herein, overall circuit operation may be achieved by utilizing ramp-type control wherein voltage level responsive devices are operated in response to a symmetrical triangular sawtooth wave form so as to cause the turn on of successive switches (as in step generator 20) in response to given potentials. Stated alternatively, the output of the 400-hertz oscillator 84 may be utilized to control voltage-responsive switches for turning on the transistors of the step generator 20 whereby the system is in essence, an amplifier.

Although the invention has been shown and described with respect to a preferred embodiment thereof, it should be obvious by those skilled in the art that the foregoing and other various changes and omissions in the form and detail thereof may be made therein without departing from the spirit and scope of the invention.

Having thus described a typical embodiment of my invention, that which I claim as new and desire to secure by Letters Patent of the United States is:

1. A static inverter including source means providing a plurality of DC potentials, means for repetitively selecting, in sequence, at a given frequency corresponding to the desired output wave form frequency, successively higher and then successively lower DC potentials from said source means so as to provide a series of increasing and decreasing staircase wave forms, and switching means for inverting alternate ones of said staircase wave forms, characterized by the fact that said source means comprises:

a primary source of DC energy;
a transformer having a tapped secondary;
means for cyclically connecting the primary of said transformer in series with said source of DC energy cyclically, at a frequency which is high with respect to the frequency of said staircase wave forms; and
a plurality of capacitors and diodes, at least one capacitor for each section of said tapped secondary, said capacitors being connected in series, one end of each capacitor being connected to a corresponding point on said secondary through a diode.

2. The static inverter according to claim 1 wherein each diode is poled to prevent conduction of current from said secondary into the related one of said capacitors during the flow of current from said source through said primary.

3. The static inverter according to claim 1 wherein said selecting means includes means permitting out of phase current flow during at least the periods in which a predetermined one of said DC potentials is selected, and wherein said switching means comprises a bridge of unilaterally conducting controlled switch means, each of said switch means being bridged by an oppositely poled diode.

4. The static inverter according to claim 1 further including means responsive to output current in excess of a predetermined magnitude to block the selection of at least one of said DC potentials.

(References on following page)

References Cited

UNITED STATES PATENTS

| | | |
|---|---|---|
| 1,691,986 | 11/1928 | Nyquist. |
| 3,100,851 | 8/1963 | Ross et al. |
| 3,391,323 | 7/1968 | Ikeda _____ 307—107 X |
| 3,419,780 | 12/1968 | Vergez _____ 321—2 |
| 3,440,514 | 4/1969 | Fenley _____ 321—45 X |
| 3,430,073 | 2/1969 | Leonard. |

FOREIGN PATENTS 1,151,584   6/1962   France.

J. D. MILLER, Primary Examiner

W. H. BEHA, Jr., Assistant Examiner

U.S. Cl. X.R.

321—9, 11, 18; 323—43.5